United States Patent [19]

Skrycki

[11] 4,254,963
[45] Mar. 10, 1981

[54] GASKET ASSEMBLY

[75] Inventor: Robert R. Skrycki, Grosse Isle, Mich.
[73] Assignee: Ex-Cell-O Corporation, Troy, Mich.
[21] Appl. No.: 100,118
[22] Filed: Dec. 4, 1979
[51] Int. Cl.³ .............................................. F16J 15/12
[52] U.S. Cl. ............................. 277/235 R; 277/235 B
[58] Field of Search ........... 277/178, 180, 186, 188 A, 277/235 R, 235 A, 235 B, 234

[56] References Cited

U.S. PATENT DOCUMENTS

| 4,121,846 | 10/1978 | Skrycki | 277/235 R |
| 4,196,913 | 4/1980 | Oka | 277/235 B |

FOREIGN PATENT DOCUMENTS

| 1260236 | 1/1972 | United Kingdom | 277/235 B |
| 1278321 | 6/1972 | United Kingdom | 277/235 B |

*Primary Examiner*—Robert S. Ward, Jr.
*Attorney, Agent, or Firm*—McGlynn and Milton

[57] ABSTRACT

A head gasket assembly disposed between a head having at least one combustion chamber therein and a cylinder block having at least one cylinder therein with the combustion chamber located at least partially outside the diameter of the cylinder and with the head including a chamber insert therein. The head gasket includes a metal core having resilient fiber on opposite surfaces thereof. A metal flange which is U-shaped in cross section engages the metal core about the cylinder opening and includes an integral extension on one side of the metal core for engaging the chamber insert so as to perfect the seal thereunder.

4 Claims, 3 Drawing Figures

GASKET ASSEMBLY

BACKGROUND OF THE INVENTION

(1) Field of the Invention

The subject invention relates to a head gasket assembly for an engine having a combustion chamber which is at least partially outside the diameter of the cylinder bore.

(2) Description of the Prior Art

A common problem with diesel engines is in sealing where a pre-combustion chamber within the head is at least partially outside the diameter of the piston. Generally, in this type of engine there is a chamber insert disposed in the head which defines a port or passage between the pre-combustion chamber and the cylinder. Due to machining tolerances the bottom surface of the insert is rarely exactly coplanar with the bottom of the head. Prior art head gasket assemblies have been constructed in such a way that there remains a sealing problem between the insert and the block. Prior art gaskets have included U-shaped metal flanges surrounding the cylinder openings so as to better perfect a seal. However, the chamber insert is beyond the diameter of these flanges which are, therefore, ineffective. Also, the high heat within the combustion chamber frets and disintegrates the paper fiber lining disposed on the metal cores generally found in most prior art head gaskets thereby further destroying the sealing capacity.

SUMMARY OF THE INVENTION

The instant invention provides a head gasket assembly adapted to be disposed between a head having a combustion chamber therein and a cylinder block having a cylinder therein with the combustion chamber located at least partially outside the diameter of the cylinder and with the head having a chamber insert disposed therein defining a passageway between the chamber and the cylinder. The head gasket assembly comprises a body means defining two parallel surfaces adapted to engage and seal the head and the cylinder block. The body means includes a metal core having resilient fiber on opposite surfaces thereof and at least one cylinder opening for surrounding the cylinder. The gasket assembly also includes a metal flange surrounding the cylinder opening. The metal flange is U-shaped in cross section with opposite legs thereof engaging the opposite surfaces of the metal core and includes an integral extension extending from a first of the legs and in engagement with the metal core for engaging the chamber insert to perfect the seal between the chamber insert and the cylinder block.

PRIOR ART STATEMENT

The prior art developments most pertinent to the subject gasket assembly are represented by the U.S. patents to Czernik, U.S. Pat. No. 3,532,349 and Pohl et al. U.S. Pat. No. 3,606,361. Both patents teach the use of a U-shaped metal shield flanged onto the body of a head gasket. However, neither patent states nor implies the extension of the flange on one side of the gasket to underlie a pre-chamber insert. Also, neither patent, with particular attention to the Czernik patent, teaches removing the resilient fiber from under the flange. Therefore, neither cited patent can obtain the sealing properties of the instant invention. Also, neither patent affords the resistance to disintegration of the paper material under the flange as does this instant invention.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
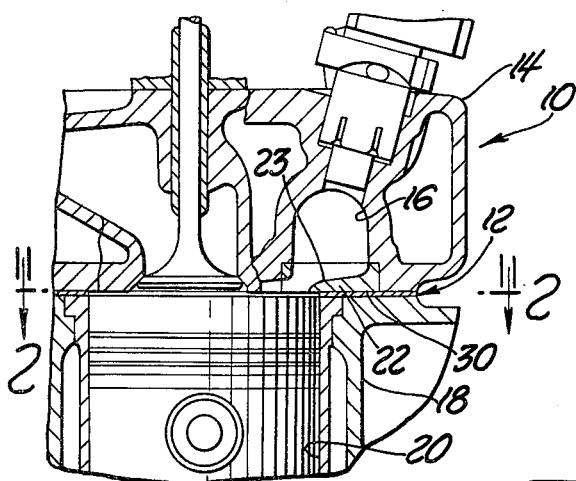
FIG. 1 is a cross-sectional view of a diesel engine showing a cylinder and pre-combustion chamber.

A diesel engine with an offset pre-combustion chamber is shown generally at 10. In FIG. 1 a head gasket assembly generally indicated at 12 is adapted to be disposed between a head 14 having a pre-combustion chamber 16 therein and a cylinder block 18 having a cylinder 20 therein such that the combustion chamber 16 is located partially outside the diameter of the cylinder 20. The head includes a chamber insert 22 therein defining a passageway 23 between the chamber 16 and the cylinder 20.

Figure 2:
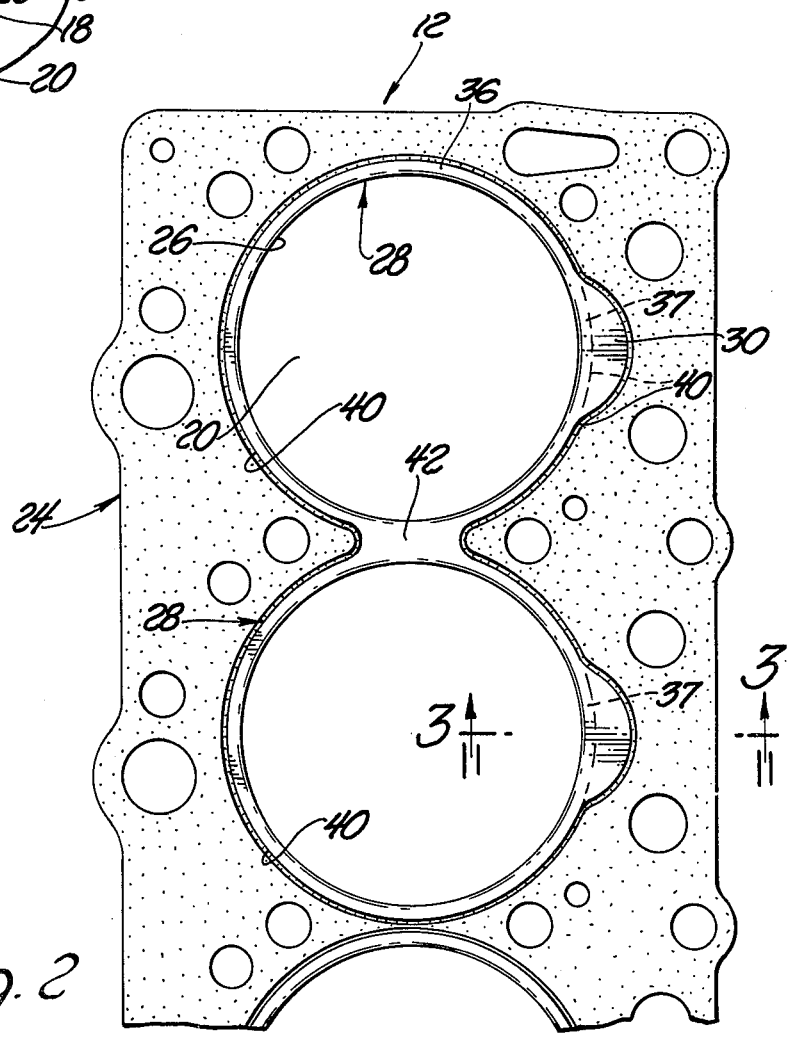
FIG. 2 is a plan view of a preferred embodiment of the gasket assembly of the instant invention.

As shown in FIG. 2, a head gasket assembly 12 includes body means having a metal core and resilient fiber on the parallel opposite surfaces thereof. The body means also includes at least one cylinder opening 26 for surrounding the cylinder 20. The gasket assembly 12 is shown having bolt holes, coolant openings, and valve push rod openings which are common to and specified for specific diesel engines.

Figure 3:
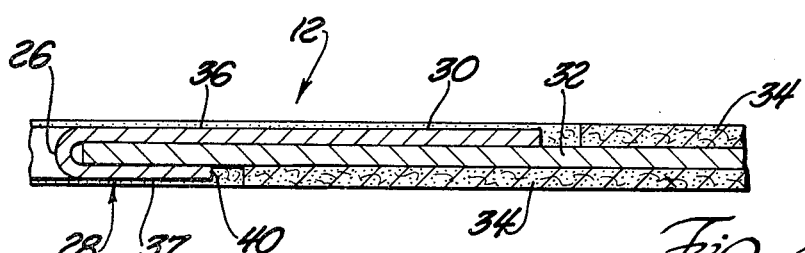
FIG. 3 is an enlarged cross-sectional view taken substantially along line 3—3 of FIG. 2.

The gasket assembly 12 also includes a metal flange, generally indicated at 28, surrounding the cylinder openings 26. The flange 28 includes an integral extension 30 on one side thereof. As shown in FIG. 3, the metal flange 28 is U-shaped in cross section with opposite legs 36 and 37 thereof engaging the opposite surfaces of the metal core 32. In other words, the resilient fiber 34 disposed on the surfaces of the metal core 32 extends up to the legs 36 and 37 of the flange but is devoid between the legs 36 and the metal core 32. The metal flange 28 includes an integral extension 30 extending from a first leg 37 and in engagement with the metal core 32. As indicated in FIG. 1, the integral extension 30 engages the chamber insert 22 to perfect the seal between the chamber insert and the cylinder block. In accordance with the invention, the resilient fibrous material is not exposed to the severe high temperature of the chamber 16 thereby decreasing fretting and disintegration of the material under the insert. The integral extension 30 therefore provides better sealing properties under the chamber insert 22.

As shown in FIG. 2, the legs 36 and 37 of the U-shaped flange 28 define coextensive circular portions directly adjacent the cylinder opening 26. The peripheral edges of the legs define a diameter 40. The integral extension 30 extends beyond the diameter 40 so as to underlie the chamber insert 22. Leg 36 follows the diameter 40 completely about the opening 26. In other words, the leg 36 on the opposite side of the gasket assembly from the extension 30 does not extend beyond the circular circumference or diameter 40 of the flange 28.

Returning to FIG. 2, the integral portion 30 of the metal flange is semi-circular in shape, however, the integral portion could assume other shapes without detracting from the effectiveness of the instant invention.

As will be appreciated, the gasket assembly 12 includes a plurality of cylinder openings 26 with each including a flange 28. Further, the flanges 28 of adjacent cylinder openings may be integrally connected, i.e., made from the same metal piece, as indicated by the bridge portion 42 which is only on one surface of the core 32.

It will also be noted that the fiber material 34 is spaced slightly from the edges of the metal flanges 28.

The invention has been described in an illustrious manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A head gasket assembly adapted to be disposed between a head having a combustion chamber therein and a cylinder block having a cylinder therein with the combustion chamber located at least partially outside the diameter of the cylinder and with a chamber insert disposed in the head for defining the passage between the chamber and the cylinder, said gasket comprising; body means defining two parallel surfaces adapted to engage and seal said head and said cylinder block, said body means including a metal core having a resilient fiber on opposite surfaces thereof and at least one cylinder opening for surrounding the cylinder, a metal flange surrounding said cylinder opening, said metal flange being U-shaped in cross section with opposite legs thereof engaging said opposite surfaces of said core, said metal flange including an integral extension extending from a first of said legs and in engagement with said metal core for engaging the chamber insert to perfect the seal between the chamber insert and the cylinder block.

2. An assembly as set forth in claim 1 wherein said legs of said metal flange define coextensive circular portions directly adjacent said cylinder opening and defining a diameter thereabout, said integral extension extending beyond said diameter so as to underlie the chamber insert.

3. An assembly as set forth in claim 2 wherein said integral extension has at least in part a circular periphery.

4. An assembly as set forth in claim 2 wherein the second of said legs follows said diameter completely about said opening.

* * * * *